(12) United States Patent
Sagesaka et al.

(10) Patent No.: US 10,784,905 B2
(45) Date of Patent: Sep. 22, 2020

(54) COMMUNICATION DEVICE

(71) Applicant: RENESAS ELECTRONICS CORPORATION, Tokyo (JP)

(72) Inventors: Yasuhiro Sagesaka, Tokyo (JP); Suguru Fujita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/447,351

(22) Filed: Jun. 20, 2019

(65) Prior Publication Data

US 2020/0007172 A1    Jan. 2, 2020

(30) Foreign Application Priority Data

Jun. 29, 2018    (JP) .................................. 2018-124954

(51) Int. Cl.
| | |
|---|---|
| *H04B 17/345* | (2015.01) |
| *H04B 1/00* | (2006.01) |
| *H04W 4/44* | (2018.01) |
| *H04B 1/10* | (2006.01) |

(52) U.S. Cl.
CPC ......... *H04B 1/0064* (2013.01); *H04B 1/1027* (2013.01); *H04B 17/345* (2015.01); *H04W 4/44* (2018.02)

(58) Field of Classification Search
CPC .. H04B 1/0064; H04B 17/345; H04B 1/1027; H04W 4/44
USPC ........................................ 455/517, 90.1, 403
See application file for complete search history.

(56) References Cited

U.S. PATENT DOCUMENTS

| | | | | |
|---|---|---|---|---|
| 5,565,858 | A * | 10/1996 | Guthrie .................. | G01S 19/09 340/10.33 |
| 5,712,641 | A * | 1/1998 | Casabona ............... | G01S 19/21 342/362 |
| 5,717,368 | A * | 2/1998 | Niiranen .................. | H03H 7/12 333/175 |
| 6,639,555 | B1 * | 10/2003 | Kane ....................... | H01Q 1/32 343/700 MS |
| 7,058,418 | B2 * | 6/2006 | Doi ...................... | H01Q 3/2605 342/372 |
| 7,212,784 | B2 * | 5/2007 | Doi ...................... | H01Q 3/2605 455/39 |
| 7,215,931 | B2 * | 5/2007 | Snyder ................... | H03D 7/163 375/223 |
| 7,346,040 | B2 * | 3/2008 | Weinstein ............. | H04L 1/0026 370/339 |

(Continued)

FOREIGN PATENT DOCUMENTS

JP    2017-050757 A    3/2017

*Primary Examiner* — Hai V Nguyen
(74) *Attorney, Agent, or Firm* — McDermott Will & Emery LLP (57) ABSTRACT

To provide a communication device that can suppress radio wave interference in communication using a plurality of frequency signals in a simply method, a communication device includes a first communication unit that communicates with a first external device by using a first frequency signal, a second communication unit that communicates with a second external device by using a second frequency signal, and a control unit that controls, when one of the first and second communication units transmits data to a corresponding one of the first and second external devices, the other of the first and second communication units not to receive data.

6 Claims, 8 Drawing Sheets

(56) References Cited

U.S. PATENT DOCUMENTS

| | | | | |
|---|---|---|---|---|
| 7,567,610 B2* | 7/2009 | Adan | H03D 7/1441 | 375/219 |
| 8,116,395 B2* | 2/2012 | Sato | H04L 27/2647 | 329/318 |
| 8,350,764 B2* | 1/2013 | Rao | H01Q 1/243 | 343/700 MS |
| 8,369,379 B2* | 2/2013 | Ye | H04J 3/0608 | 370/436 |
| 8,514,146 B2* | 8/2013 | Gummalla | H01Q 1/38 | 343/909 |
| 8,856,850 B2* | 10/2014 | Sala | H04N 17/00 | 725/107 |
| 9,001,932 B2* | 4/2015 | Ruelke | H04N 21/42638 | 375/322 |
| 9,059,768 B1* | 6/2015 | Sorsby | H04B 1/123 | |
| 9,161,386 B1* | 10/2015 | Beghini | H04W 88/06 | |
| 9,214,086 B1* | 12/2015 | Onishi | G08G 1/096791 | |
| 9,628,137 B2* | 4/2017 | Tota | H01Q 5/335 | |
| 9,887,465 B2* | 2/2018 | Gummalla | H01Q 1/38 | |
| 10,098,014 B1* | 10/2018 | Shimizu | H04B 7/0617 | |
| 10,142,062 B2* | 11/2018 | Noda | H04B 15/00 | |
| 10,264,525 B2* | 4/2019 | Pratt | H04W 52/0209 | |
| 10,299,149 B2* | 5/2019 | Kleinbeck | H04B 17/309 | |
| 10,419,655 B2* | 9/2019 | Sivan | H04W 4/80 | |
| 10,469,619 B2* | 11/2019 | Shimizu | H04L 67/327 | |
| 10,517,005 B2* | 12/2019 | Dzierwa | G06N 5/022 | |
| 2003/0153338 A1* | 8/2003 | Herz | H04L 45/124 | 455/517 |
| 2004/0048585 A1* | 3/2004 | Snyder | H04B 1/406 | 455/115.1 |
| 2005/0117664 A1* | 6/2005 | Adan | H04B 1/408 | 375/316 |
| 2006/0079194 A1* | 4/2006 | Tired | H03F 3/50 | 455/283 |
| 2007/0218850 A1* | 9/2007 | Pan | H03D 7/1491 | 455/189.1 |
| 2008/0212552 A1* | 9/2008 | Fukamachi | H04B 1/406 | 370/343 |
| 2008/0300002 A1* | 12/2008 | Sheffer | H04B 1/7097 | 455/509 |
| 2011/0130163 A1* | 6/2011 | Saban | H04W 88/085 | 455/517 |
| 2011/0267474 A1* | 11/2011 | Sala | H04N 17/00 | 348/180 |
| 2011/0298669 A1* | 12/2011 | Rao | H01Q 9/42 | 343/702 |
| 2013/0109328 A1* | 5/2013 | Watanabe | H04B 1/005 | 455/73 |
| 2013/0337855 A1* | 12/2013 | Alexander | H04W 72/082 | 455/501 |
| 2014/0016515 A1* | 1/2014 | Jana | H04B 1/525 | 370/278 |
| 2014/0185718 A1* | 7/2014 | Ruelke | H04N 21/42638 | 375/345 |
| 2015/0348412 A1* | 12/2015 | Onishi | G08G 1/162 | 340/905 |
| 2016/0127009 A1* | 5/2016 | McMeekin | H04B 1/123 | 455/83 |
| 2016/0173166 A1* | 6/2016 | Tota | H04L 5/001 | 455/77 |
| 2016/0219506 A1* | 7/2016 | Pratt | H04B 7/0434 | |
| 2017/0134122 A1* | 5/2017 | Noda | H04L 1/02 | |
| 2017/0243138 A1* | 8/2017 | Dzierwa | H04B 17/309 | |
| 2017/0243139 A1* | 8/2017 | Dzierwa | H04B 17/27 | |
| 2017/0244160 A1* | 8/2017 | Neubecker | H01Q 13/10 | |
| 2017/0250766 A1* | 8/2017 | Dzierwa | H04B 17/373 | |
| 2017/0290075 A1* | 10/2017 | Carbajal | H04W 72/0453 | |
| 2017/0374572 A1* | 12/2017 | Kleinbeck | H04B 17/23 | |
| 2017/0374573 A1* | 12/2017 | Kleinbeck | H04W 24/08 | |
| 2018/0062767 A1* | 3/2018 | Vallese | H04B 1/525 | |
| 2018/0070253 A1* | 3/2018 | Kleinbeck | H04B 17/318 | |
| 2018/0175492 A1* | 6/2018 | Sasaki | H01Q 1/3208 | |
| 2018/0211179 A1* | 7/2018 | Dzierwa | H04B 17/30 | |
| 2018/0368082 A1* | 12/2018 | O'Shea | H04B 1/406 | |
| 2019/0056476 A1* | 2/2019 | Lin | G01S 13/34 | |
| 2019/0072601 A1* | 3/2019 | Dzierwa | G08B 21/18 | |
| 2019/0094333 A1* | 3/2019 | Va | G01S 13/931 | |
| 2019/0154439 A1* | 5/2019 | Binder | G01S 15/08 | |
| 2019/0182415 A1* | 6/2019 | Sivan | H04W 4/80 | |
| 2019/0208112 A1* | 7/2019 | Kleinbeck | G01S 3/00 | |
| 2019/0238658 A1* | 8/2019 | Shimizu | H04W 4/80 | |
| 2019/0274059 A1* | 9/2019 | Kleinbeck | H04W 64/006 | |
| 2019/0305903 A1* | 10/2019 | Badic | H04W 64/003 | |
| 2019/0332107 A1* | 10/2019 | Shimizu | H04W 4/44 | |
| 2019/0364492 A1* | 11/2019 | Azizi | H04W 48/10 | |
| 2019/0387152 A1* | 12/2019 | Sivan | G06F 3/012 | |
| 2019/0392235 A1* | 12/2019 | Shimizu | G07C 5/008 | |

* cited by examiner

FREQUENCY SELECTIVITY
CHARACTERISTICS
OF ATTENUATOR 221

FIG. 3B

FREQUENCY SELECTIVITY
CHARACTERISTICS
OF ATTENUATOR 232

COMMUNICATION DEVICE

CROSS-REFERENCE TO RELATED APPLICATIONS

The disclosure of Japanese Patent Application No. 2018-124954 filed on Jun. 29, 2018 including the specification, drawings and abstract is incorporated herein by reference in its entirety.

BACKGROUND

The present disclosure relates to a communication device that uses a plurality of different frequency signals to perform communication.

Various techniques for avoiding radio interference between a plurality of radio waves have been conventionally proposed (Japanese Unexamined Patent Application Publication No. 2017-50757).

For example, Japanese Unexamined Patent Application Publication No. 2017-50757 proposes a technique of providing a fixed attenuator and a fixed phase shifter between different radio signal paths (signal lines each coupling an antenna and a radio machine to each other) and adjusting the attenuator and the phase shifter in accordance with a radio output to avoid interference.

Specifically, this technique avoids interference by using the property in which two radio waves are canceled out with each other when being mixed with each other with the same amplitude and in opposite phases. This technique basically avoids interference when the two radio waves have the same frequency or close frequencies.

In recent years, an intelligent transportation system (ITS) for automotive use uses different frequency bands. For example, a communication system using a 760 MHz band is proposed for a vehicle-to-vehicle and/or road-to-vehicle communication system.

Also, a road-to-vehicle communication system is proposed as a dedicated short range communication (DSRC) other than the vehicle-to-vehicle and/or road-to-vehicle communication system, which uses a 5.8 GHz band.

One known DSRC system is an electronic toll collection (ETC) system.

It is also necessary to suppress radio wave interference between frequency signals in different bands.

SUMMARY

The present disclosure has been made to overcome the above-described problems, and it is an object of the present disclosure to provide a communication device capable of suppressing radio wave interference in communication that uses a plurality of frequency signals in a simple method.

Other objects and novel features will be apparent from the description of this specification and the accompanying drawings.

A communication device according to an aspect of the present disclosure includes a first communication unit operable to communicate with a first external device by using a first frequency signal, a second communication unit operable to communicate with a second external device by using a second frequency signal, and a control unit operable to, when one of the first and second communication units transmits data to a corresponding one of the first and second external devices, control the other of the first and second communication units not to receive data.

According to an embodiment, a communication device of the present disclosure can suppress radio wave interference in communication that uses a plurality of frequency signals in a simple method.

DETAILED DESCRIPTION

Embodiments are described in detail, referring to the drawings. The same or corresponding portions in the drawings are labeled with the same reference sign, and the description thereof is not repeated.

First Embodiment

Figure 1:
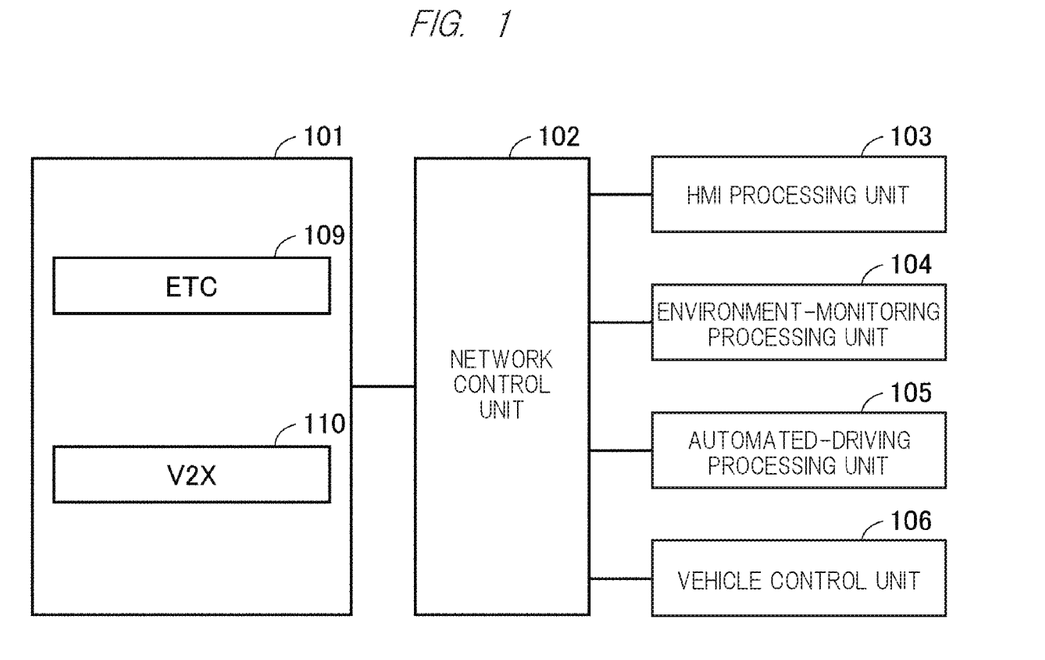
FIG. 1 illustrates a vehicle system according to a first embodiment.

FIG. 1 illustrates a vehicle system according to a first embodiment.

Referring to FIG. 1, the vehicle system according to the first embodiment includes a communication device 101, a network control unit 102, an HMI processing unit 103, an environment-monitoring processing unit 104, an automated-driving processing unit 105, and a vehicle control unit 106.

The communication device 101 performs communication with an external device.

For example, the communication system 101 performs communication with another vehicle or an ETC in an ITS system.

The network control unit 102 controls transmission and reception of data between the communication device 101 and each function unit of the vehicle system.

The HMI (Human Machine Interface) processing unit 103 provides various types of assists (that is, actuation) to a driver in order to place the driver in a proper driving state.

The environment-monitoring processing unit 104 monitors information around a vehicle from a camera and/or a sensor, for example, and processes the information.

The automated-driving processing unit 105 performs processing when the vehicle is controlled to perform automated driving.

The vehicle control unit 106 controls the vehicle.

The communication device 101 according to the first embodiment includes an ETC communication unit 109 and a V2X communication unit 110.

The ETC communication unit 109 performs data communication with an ETC that is an external device.

The V2X communication unit 110 performs vehicle-to-vehicle communication with another vehicle that is an external device.

Figure 2:
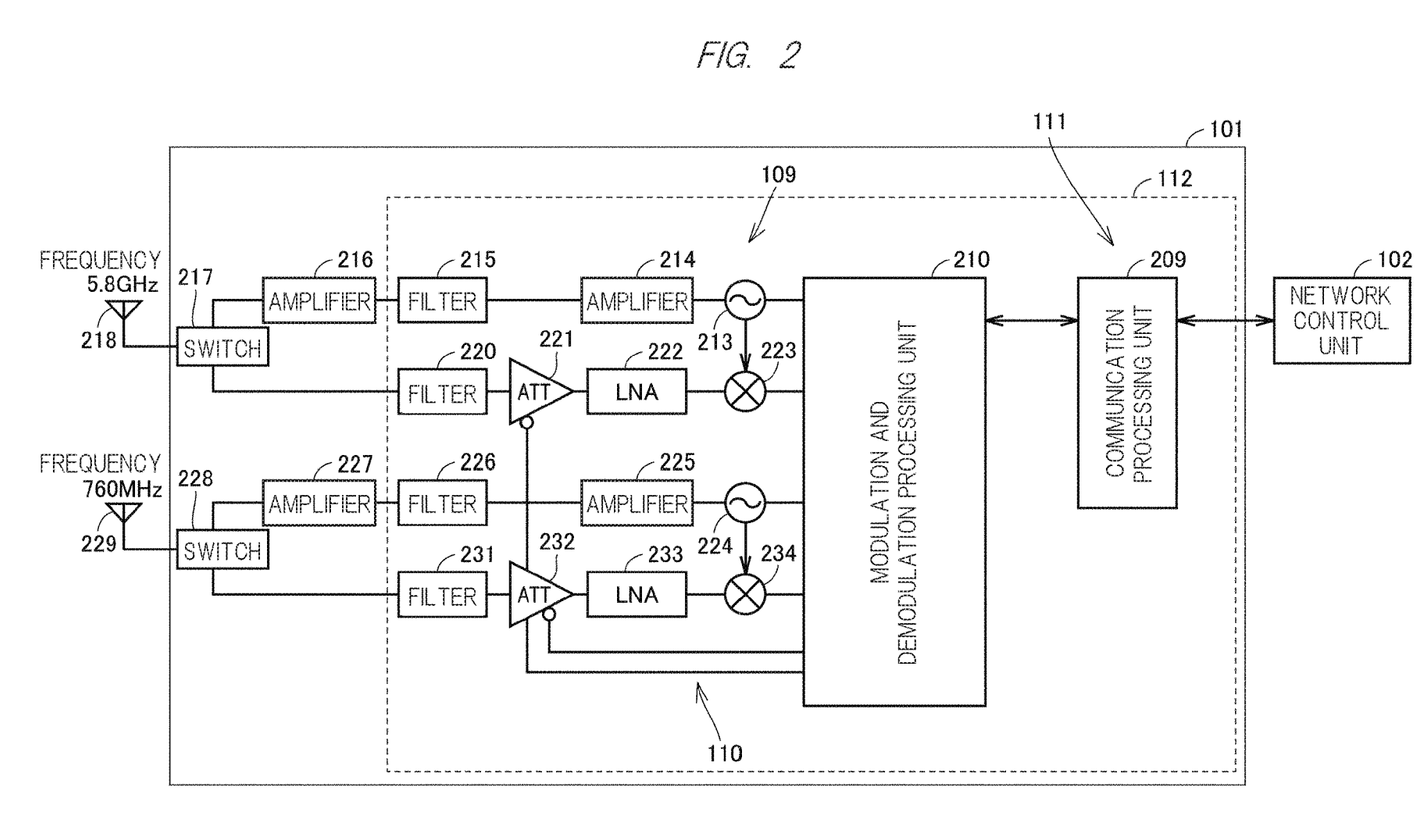
FIG. 2 illustrates a communication device 101 according to the first embodiment.

FIG. 2 illustrates the communication device 101 according to the first embodiment.

Referring to FIG. 2, the communication device 101 includes the ETC communication unit 109, the V2X communication unit 110, and an overall communication control unit 111.

The ETC communication unit 109 includes an antenna 218, a switch 217, amplifiers 214 and 216, an oscillator 213, a mixer 223, filters 215 and 220, an attenuator 221, and an LNA (low noise amplifier) 222.

The V2X communication unit 110 includes an antenna 229, a switch 228, amplifiers 225 and 227, an oscillator 224, a mixer 234, filters 226 and 231, an attenuator 232, and an LNA (low noise amplifier) 233.

The overall communication control unit 111 is provided for the ETC communication unit 109 and the V2X communication unit 110 in common.

The overall communication control unit 111 includes a modulation and demodulation processing unit 210 and a communication processing unit 209.

The communication processing unit 209 transmits and receives data to/from the network control unit 102, and outputs data received from the modulation and demodulation processing unit 210 to the network control unit 102 and outputs transmission data to the modulation and demodulation processing unit 210 in accordance with an instruction from the network control unit 102. The communication processing unit 209 may have a function of encryption/decryption. Specifically, the communication processing unit 209 outputs encrypted transmission data to the modulation and demodulation processing unit 210. Alternatively, the communication processing unit 209 may decrypt the encrypted received data and then output it to the network control unit 102.

The modulation and demodulation processing unit 210 modulates the transmission data output from the communication processing unit 209 and outputs a transmission signal to the ETC communication unit 109 or the V2X communication unit 110. Also, the modulation and demodulation processing unit 210 demodulates a reception signal output from the ETC communication unit 109 or the V2X communication unit 110 and outputs received data to the communication processing unit 209.

The ETC communication unit 109 transmits and receives a first frequency signal (a frequency of 5.8 GHz) via the antenna 218.

The switch 217 switches coupling of the antenna 218 in transmission and reception.

The oscillator 213 outputs an oscillation signal (a frequency of 5.8 GHz) in accordance with the transmission signal output from the modulation and demodulation processing unit 210.

The amplifier 214 amplifies the oscillation signal and outputs it to the filter 215. The filter 215 removes noise included in the oscillation signal.

The amplifier 216 amplifies the oscillation signal with noise removed therefrom, which has passed through the filter 215.

A transmission signal to an ETC is then output from the antenna 218 via the switch 217.

The antenna 218 receives a reception signal from the ETC. The filter 220 receives input of the reception signal from the ETC via the switch 217. The filter 220 removes noise of the reception signal and outputs the reception signal without noise to the attenuator 221.

The attenuator 221 operates in accordance with an operation instruction from the modulation and demodulation processing unit 210. The attenuator 221 attenuates a signal in a predetermined frequency band included in the reception signal in accordance with the operation instruction from the modulation and demodulation processing unit 210. Meanwhile, if there is no operation instruction from the modulation and demodulation processing unit 210, the attenuator 221 allows the reception signal from the filter 220 to pass as it is.

The LNA 222 amplifies a signal output from the attenuator 221 and outputs it to the mixer 223.

The mixer 223 performs mixing based on the oscillation signal oscillated by the oscillator 213 and outputs a baseband signal to the modulation and demodulation processing unit 210.

The modulation and demodulation processing unit 210 demodulates received data of the reception signal based on the baseband signal.

The V2X communication unit 110 transmits and receives a second frequency signal (a frequency of 760 MHz) via the antenna 229.

The switch 228 switches coupling of the antenna 229 in transmission and reception.

The oscillator 224 outputs an oscillation signal (a frequency of 760 MHz) in accordance with the transmission signal output from the modulation and demodulation processing unit 210.

The amplifier 225 amplifies the oscillation signal and outputs it to the filter 226. The filter 226 removes noise included in the oscillation signal.

The amplifier 227 amplifies the oscillation signal with noise removed therefrom, which has passed through the filter 226.

A transmission signal to another vehicle is then output from the antenna 229 via the switch 228.

The antenna 229 receives a reception signal from another vehicle. The filter 231 receives input of the reception signal from the other vehicle via the switch 228. The filter 231 removes noise of the reception signal and outputs the reception signal without noise to the attenuator 232.

The attenuator 232 operates in accordance with an operation instruction from the modulation and demodulation processing unit 210. The attenuator 232 attenuates a signal in a predetermined frequency band included in the reception signal in accordance with the operation instruction from the modulation and demodulation processing unit 210. Meanwhile, if there is no operation instruction from the modulation and demodulation processing unit 210, the attenuator 232 allows the reception signal from the filter 231 to pass as it is.

The LNA 233 amplifies a signal output from the attenuator 232 and outputs it to the mixer 234.

The mixer 234 performs mixing based on the oscillation signal oscillated by the oscillator 224 and outputs a baseband signal to the modulation and demodulation processing unit 210.

The modulation and demodulation processing unit 210 demodulates received data of the reception signal based on the baseband signal.

Figure 3A:
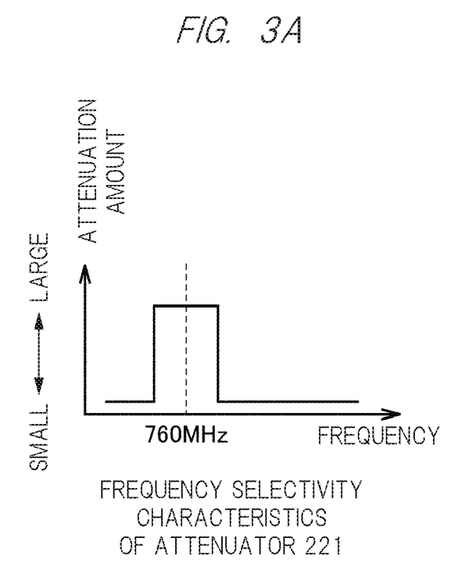
FIGS. 3A and 3B illustrate attenuation characteristics (frequency selectivity characteristics) of attenuators 221 and 232 according to the first embodiment.
Figure 3B:
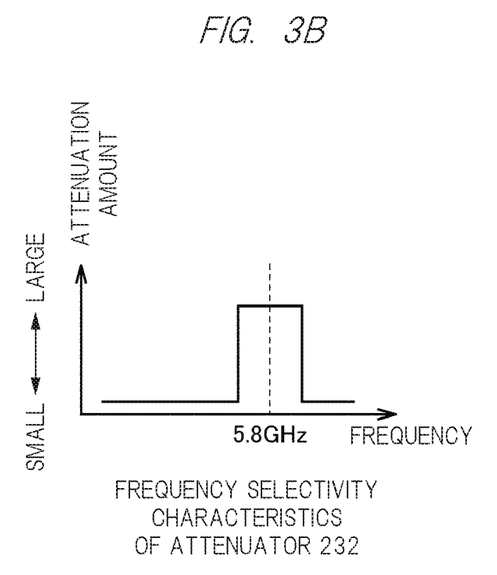

FIGS. 3A and 3B illustrate attenuation characteristics (frequency selectivity characteristics) of the attenuators 221 and 232 according to the first embodiment.

Referring to FIG. 3A, the attenuator 221 has a large attenuation amount in a frequency band around a frequency of 760 MHz and a small attenuation amount in a frequency band other than the band around the frequency of 760 MHz during an operation.

Referring to FIG. 3B, the attenuator 232 has a large attenuation amount in a frequency band around a frequency of 5.8 GHz and a small attenuation amount in a frequency band other than the band around the frequency of 5.8 GHz during an operation.

Figure 4:
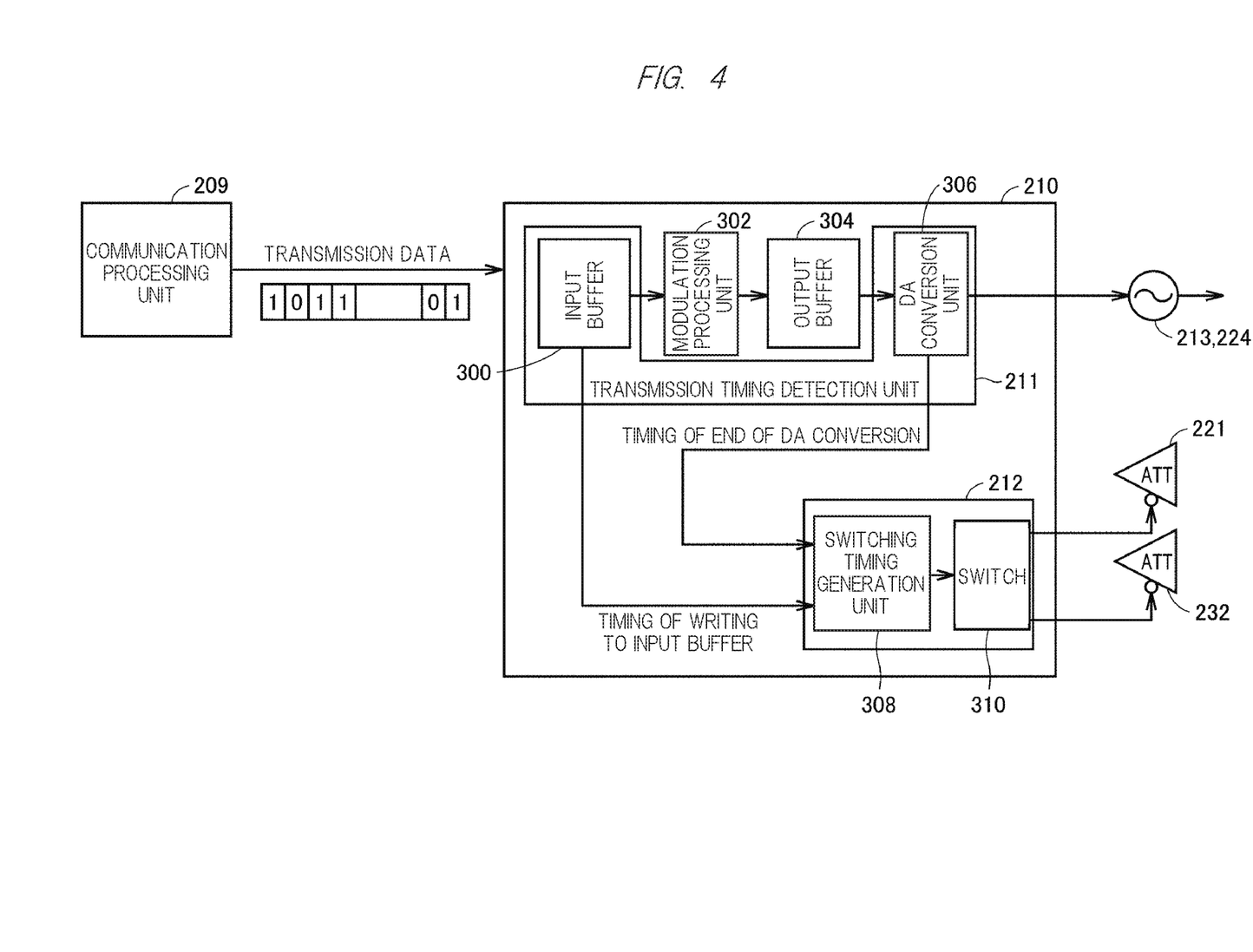
FIG. 4 illustrates functional blocks of a modulation and demodulation processing unit 210 according to the first embodiment.

FIG. 4 illustrates functional blocks of the modulation and demodulation processing unit 210 according to the first embodiment.

Referring to FIG. 4, the modulation and demodulation processing unit 210 includes a transmission timing detection unit 211, a modulation processing unit 302, an output buffer 304, and an interference control unit 212.

The transmission timing detection unit 211 detects a timing of outputting transmission data.

The transmission timing detection unit 211 includes an input buffer 300 and a DA conversion unit 306.

The input buffer 300 receives the transmission data input thereto and stores it therein. When receiving input of the transmission data, the input buffer 300 notifies the interference control unit 212 of occurrence of a timing of writing to the input buffer.

The DA conversion unit 306 receives a digital signal of the transmission data input thereto from the output buffer 304 and converts it to an analog signal. The DA conversion unit 306 detects end of the DA conversion and notifies the interference control unit 212 of the end of DA conversion.

The transmission timing detection unit 211 detects the length of the transmission data and outputs a signal in accordance with the detection result to the interference control unit 212.

The modulation processing unit 302 modulates the transmission data stored in the input buffer 300 and outputs the modulated data to the output buffer 304.

The output buffer 304 stores therein the transmission data modulated by the modulation processing unit 302.

The DA conversion unit 306 converts the transmission data stored in the output buffer 304 to an analog signal and outputs a transmission signal to the oscillator 213 or 224.

The interference control unit 212 controls the attenuators 221 and 232 based on the result of detection by the transmission timing detection unit 211.

The interference control unit 212 includes a switching timing control unit 308 and a switch 310.

The switching timing control unit 308 controls the attenuators 221 and 232 based on the signal indicating occurrence of a timing of writing to the input buffer and the signal indicating that DA conversion is ended, both detected by the transmission timing detection unit 211.

Specifically, the switching timing control unit 308 instructs the attenuator 221 or 232 to perform attenuation in accordance with the signal indicating occurrence of a timing of writing to the input buffer, detected by the transmission timing detection unit 211, and instructs the attenuator 221 or 232 to end execution of attenuation based on the signal indicating that DA conversion is ended.

The switch 310 switches an operation signal to be output to the attenuator 221 or 232 in accordance with the type of transmission data. Specifically, in the case where transmission data from the communication processing unit 209 (a frequency of 5.8 GHz) is for the ETC communication unit 109, the switch 310 outputs the operation signal to the attenuator 232. In the case where transmission data from the communication processing unit 209 (a frequency of 760 MHz) is for the V2X communication unit 110, the switch 310 outputs the operation signal to the attenuator 221.

The interference control unit 212 according to the first embodiment makes the attenuator 232 operate when transmission data is transmitted from the ETC communication unit 109 to an ETC. Meanwhile, the interference control unit 212 makes the attenuator 221 operate when transmission data is transmitted from the V2X communication unit 110 to another vehicle.

By the above processes, it is possible to control the V2X communication unit 110 not to receive data when the ETC communication unit 109 transmits data. Further, when the V2X communication unit 110 transmits data, it is possible to control the ETC communication unit 109 not to receive data.

Specifically, the switching timing control unit 308 makes the attenuator 232 operate when the ETC communication unit 109 transmits data. The attenuator 232 attenuates a signal in a frequency band around 5.8 GHz, as described referring to FIG. 3B. The attenuator 232, however, does not attenuate a signal in another frequency band (for example, a 760 MHz band).

Therefore, the V2X communication unit 110 can avoid radio wave interference between data transmitted from another vehicle (e.g., 760 MHz) and data transmitted from the ETC communication unit 109 (e.g., 5.8 GHz).

Further, the V2X communication unit 110 is controlled not to receive data transmitted from the ETC communication unit 109 (5.8 GHz), so that input of unnecessary transmission data is prevented to enable reduction of erroneous reception and reduction of processing load of a circuit in a subsequent stage, for example, the modulation and demodulation processing unit 210 and the communication processing unit 209. It is also possible to reduce power consumption in association with the processing load.

In addition, the switching timing control unit 308 makes the attenuator 221 operate when the V2X communication unit 110 transmits data. The attenuator 221 attenuates a signal in a frequency band around 760 MHz, as described referring to FIG. 3A. The attenuator 221, however, does not attenuate a signal in another frequency band (for example, a 5.8 GHz band).

Therefore, the ETC communication unit 109 can avoid radio wave interference between data transmitted from an ETC (e.g., 5.8 GHz) and data transmitted to another vehicle (e.g., 760 MHz).

It is therefore possible to suppress lowering of a performance of a reception process in the modulation and demodulation processing unit 210.

Further, the ETC communication unit 109 is controlled not to receive data transmitted from the V2X communication unit 110 (760 GHz), so that input of unnecessary transmission data is prevented to enable reduction of erroneous reception and reduction of processing load of a circuit in a subsequent stage, for example, the modulation and demodulation processing circuit 210 and the communication processing unit 209. It is also possible to reduce power consumption in association with the processing load.

The communication device 101 according to the first embodiment can suppress radio wave interference in communication that uses a plurality of frequency signals in a simple method by providing the attenuators 221 and 232.

The ETC communication unit 109 and the V2X communication unit 110 are arranged in one housing.

In this example, a region surrounded by a broken line 112 represents that the region is molded into one chip, and has a structure less affected by noise from outside.

The amplifiers 216 and 227 are arranged outside the chip. A high-power transmission signal amplified by the amplifier 217 or 227 is received by the other circuit via an antenna, and may also affect the other circuit not via the antenna as noise.

However, by providing the attenuators 221 and 232 within the chip, it is also possible to surely suppress the effect of noise that has propagated not via the antenna.

Second Embodiment

The first embodiment has described a method of, when one communication unit transmits data, suppressing radio wave interference by attenuation by an attenuator provided in the other communication unit. A second embodiment describes attenuation by an attenuator when a communication unit receives data.

Figure 5:
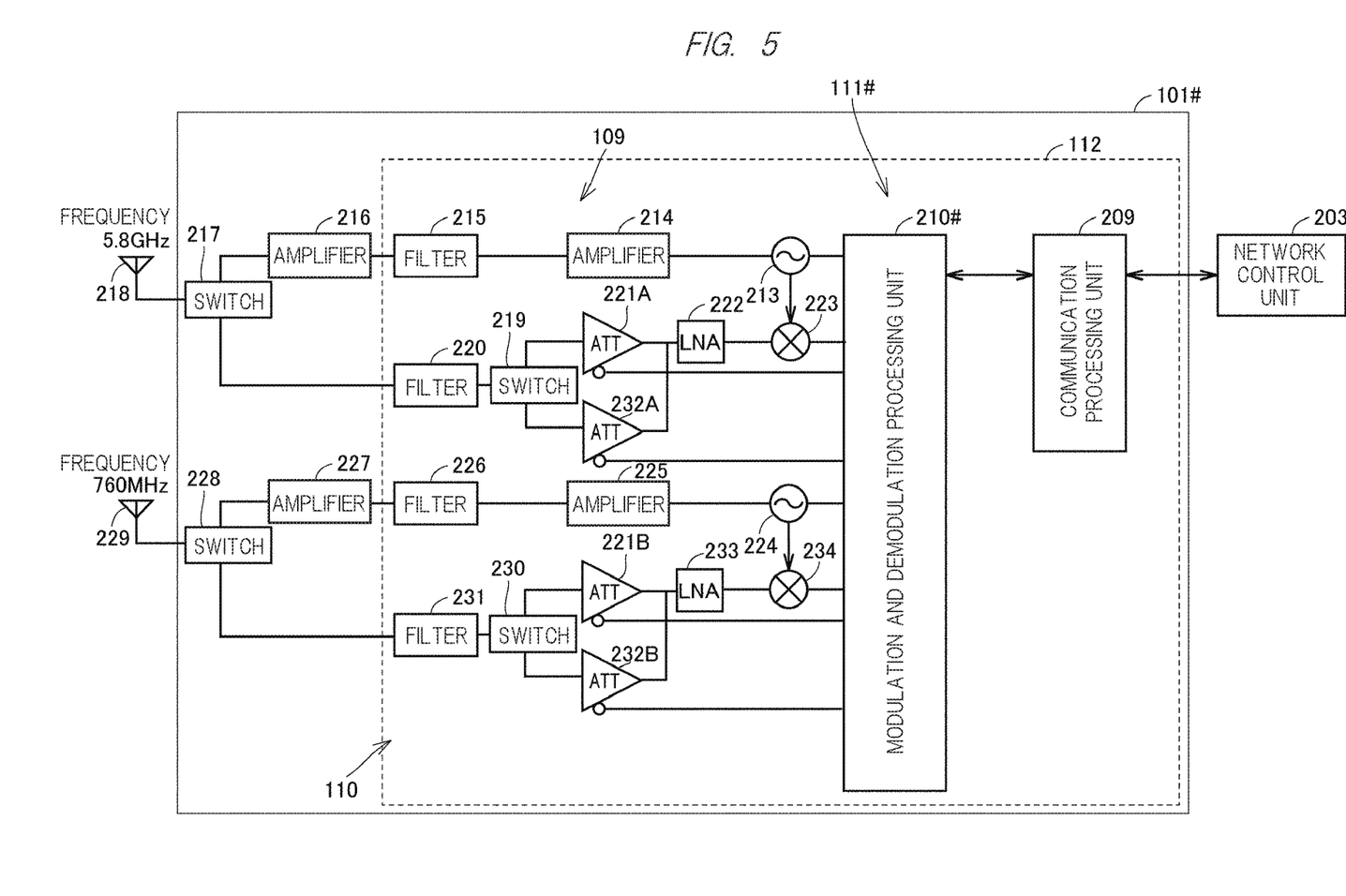
FIG. 5 illustrates a communication device 101# according to a second embodiment.

FIG. 5 illustrates a communication device 101# according to the second embodiment.

Referring to FIG. 5, the communication device 101# is different from the communication device 101 in that the overall communication unit 111 is replaced with an overall communication control unit 111#. Specifically, one of differences is that the modulation and demodulation processing unit 210 is replaced with a modulation and demodulation processing unit 210#. Other differences are that switches 219 and 230 are provided and that attenuators 221A, 221B, 232A, and 232B are provided in place of the attenuators 221 and 232. The other configuration is the same as that of the communication device 101 described in the first embodiment, and therefore the detailed description thereof is not repeated.

As illustrated in FIG. 3A, the attenuators 221A and 221B have a large attenuation amount in a frequency band around a frequency of 760 MHz and a small attenuation amount in a frequency band other than the band around the frequency of 760 MHz during an operation.

As illustrated in FIG. 3B, the attenuators 232A and 232B have a large attenuation amount in a frequency band around a frequency of 5.8 GHz and a small attenuation amount in a frequency band other than the band around the frequency of 5.8 GHz during an operation.

In this second embodiment, when the ETC communication unit 109 transmits data, the V2X communication unit 110 makes the attenuator 232B operate as described in the first embodiment. The switch 230 is coupled to the attenuator 232B. The V2X communication unit 110 avoids radio wave interference between data transmitted from another vehicle (e.g., 760 MHz) and data transmitted from the ETC communication unit 109 (e.g., 5.8 GHz).

When the V2X communication unit 110 transmits data, the ETC communication unit 109 makes the attenuator 221A operate as described in the first embodiment. The switch 219 is coupled to the attenuator 221A. The ETC communication unit 109 avoids radio wave interference between data transmitted from an ETC (e.g., 5.8 GHz) and data transmitted to another vehicle (e.g., 760 MHz).

Further, the ETC communication unit 109 and the V2X communication unit 110 according to the second embodiment each perform attenuation by an attenuator when receiving data of excessive power.

The modulation and demodulation processing unit 210# detects power of a reception signal and controls the switches 219 and 230 and the attenuators 221B and 232A based on the detection result.

Figure 6:
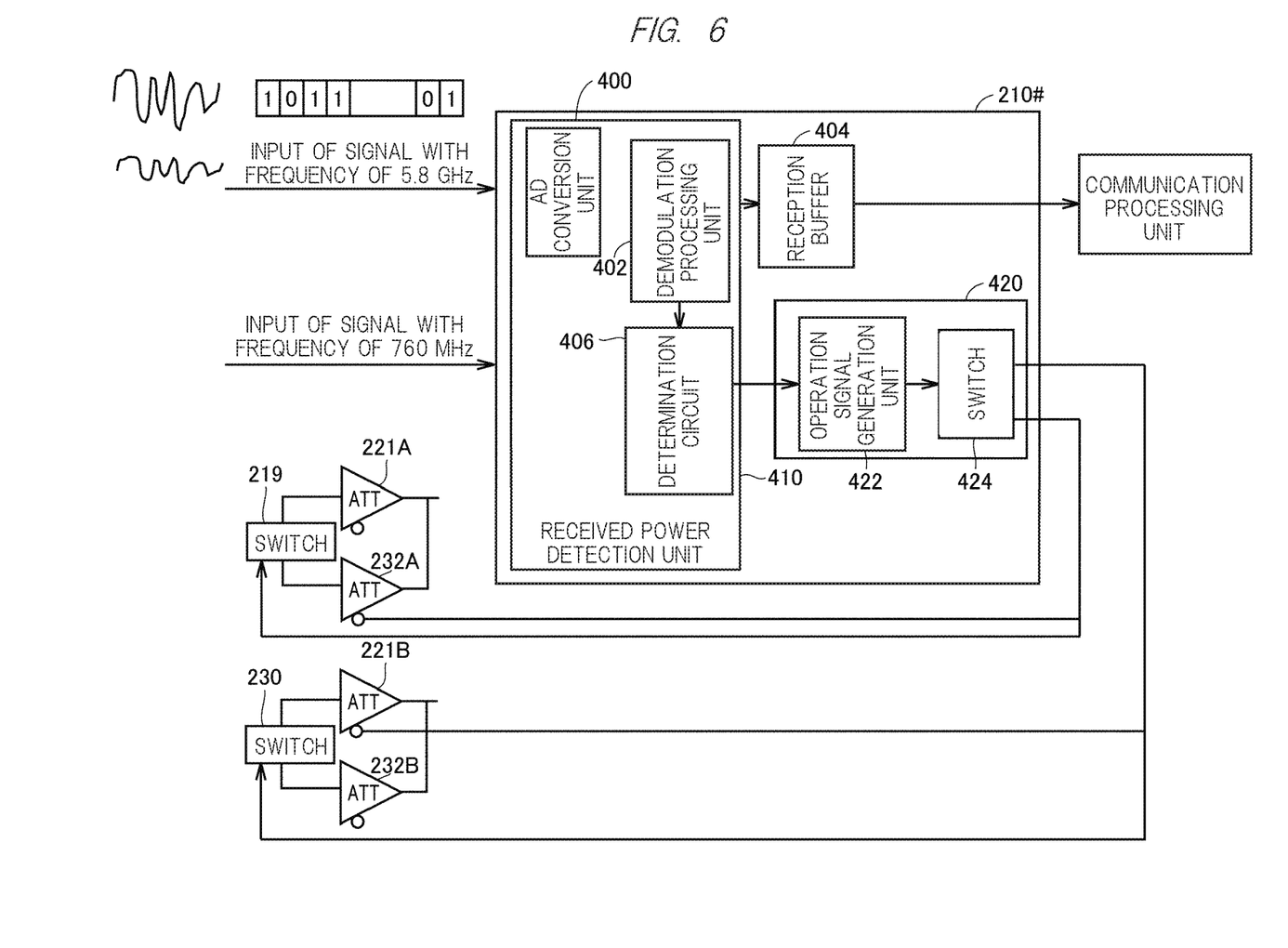
FIG. 6 illustrates functional blocks of a modulation and demodulation processing unit 210# according to the second embodiment.

FIG. 6 illustrates functional blocks of the modulation and demodulation processing unit 210# according to the second embodiment.

Referring to FIG. 6, the modulation and demodulation processing unit 210# includes a received power detection unit 410, a reception buffer 404, and an attenuator control unit 420.

The received power detection unit 410 detects power of a reception signal.

The received power detection unit 410 includes an AD conversion unit 400, a demodulation processing unit 402, and a determination circuit 406.

The AD conversion unit 400 receives the reception signal input thereto and converts an analog signal to digital data, and outputs the digital data to the demodulation processing unit 402.

The demodulation processing unit 402 demodulates received data input from the AD conversion unit 400 and stores it in the reception buffer 404.

The received data is output from the reception buffer 404 to the communication processing unit 209.

The determination circuit 406 determines a signal intensity of the reception signal (received power) based on the received data demodulated by the demodulation processing unit 402.

The determination circuit 406 outputs the determination result to the attenuator control unit 420.

The attenuator control unit 420 controls the switches 219 and 230 and the attenuators 221B and 232A based on the determination result output from the received power detection unit 410.

The attenuator control unit 420 includes an operation signal generation unit 422 and a switch 424.

The operation signal generation unit 422 controls the switches 219 and 230 and the attenuators 221B and 232A based on the determination result from the determination circuit 406.

Specifically, the operation signal generation unit 422 outputs a switching instruction to the switch 219 or 230 in accordance with the determination result that the signal intensity of the received data detected by the determination circuit 406 is a predetermined threshold or more, and also instructs the attenuator 221B or 232A to perform attenuation.

The switch 424 outputs, in accordance with the type of the received data, the switching instruction to the switch 219 or 230 and the operation signal to the attenuator 221B or 232A.

Specifically, in the case where received data that is excessive power from the ETC communication unit 109 (a frequency of 5.8 GHz) is input to the modulation and demodulation processing unit 210#, the switch 424 outputs the switching instruction to the switch 219 to be coupled to the attenuator 232A, and outputs the operation signal to the attenuator 232A.

In the case where received data that is excessive power from the V2X communication unit 110 (a frequency of 760 MHz) is input to the modulation and demodulation processing unit 210#, the switch 424 outputs the switching instruction to the switch 230 to be coupled to the attenuator 221B, and outputs the operation signal to the attenuator 221B.

That is, the attenuator control unit 420 according to the second embodiment makes the attenuator 232A operate when receiving received data that is excessive power via the ETC communication unit 109.

Meanwhile, the attenuator control unit 420 makes the attenuator 221B operate when receiving received data that is excessive power via the V2X communication unit 110.

Figure 7:
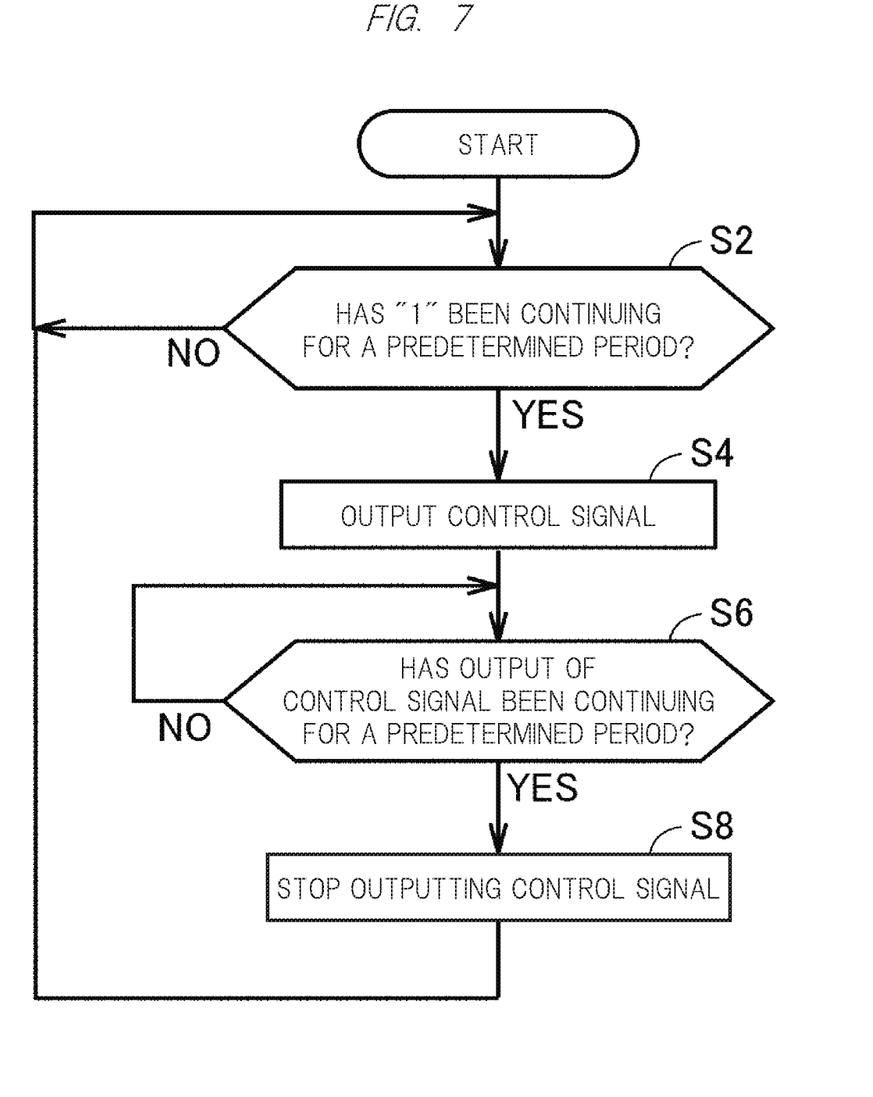
FIG. 7 illustrates a determination method in a determination circuit 406 according to the second embodiment.

FIG. 7 illustrates a determination method in the determination circuit 406 according to the second embodiment.

Referring to FIG. 7, the determination circuit 406 determines whether "1" has been continuing for a predetermined period (Step S2).

When determining that "1" has been continuing for the predetermined period in Step S2 (YES in Step S2), the determination circuit 406 determines that a signal intensity of received data is a predetermined threshold or more and outputs a control signal (a switching instruction and an operation signal) (Step S4).

The determination circuit 406 then determines whether a predetermined period has passed (Step S6).

In Step S6, the determination circuit 406 keeps a state until the predetermined period passes.

When determining that the predetermined period has passed (YES in Step S6), the determination circuit 406 stops outputting the control signal (the switching instruction and the operation signal) (Step S8).

The determination circuit 406 then returns to Step S2.

When determining that "1" has not been continuing for the predetermined period in Step S2 (NO in Step S2), the determination circuit 406 keeps the state in Step S2.

Figure 8:
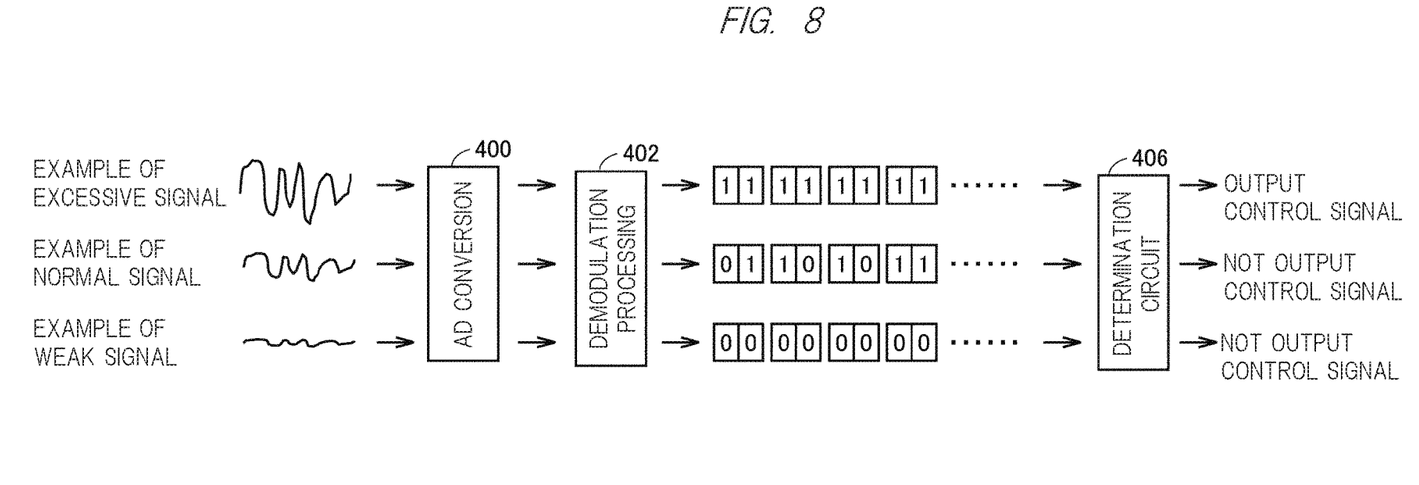
FIG. 8 illustrates processing in a received power detection unit 410 according to the second embodiment.

FIG. 8 illustrates processing in the received power detection unit 410 according to the second embodiment.

FIG. 8 illustrates a case where three types of reception signals are input.

Specifically, an excessive signal, a normal signal, and a weak signal are illustrated as an example.

In the case where the excessive signal is input, the modulation processing unit 402 continues to output received data ("1"). Therefore, the determination circuit 406 determines that "1" has been continuing for the predetermined period, determines that a signal intensity of the received data is a predetermined threshold or more, and outputs a control signal.

In the case where the normal signal is input, the modulation processing unit 402 outputs received data ("1" or "0"). Therefore, the determination circuit 406 determines that "1" has not been continuing for the predetermined period, determines that the signal intensity of the received data is not the predetermined threshold or more, and does not output the control signal.

In the case where the weak signal is input, the modulation processing unit 402 continues to output received data ("0"). Therefore, the determination circuit 406 determines that "1" has not been continuing for the predetermined period, determines that the signal intensity of the received data is not the predetermined threshold or more, and does not output the control signal.

By switching a switch when a signal intensity of received data is a predetermined threshold or more to make an attenuator operate, it is possible to suppress input of an excessive signal. Thus, it is possible to protect a circuit of the ETC communication unit 109 or the V2X communication unit 110. Accordingly, it is possible to suppress deterioration of a circuit life.

The present embodiment has described a case of using the attenuators 232A and 221B that have the attenuation characteristics (the frequency selectivity characteristics) illustrated in FIGS. 3A and 3B for suppressing input of an excessive signal. However, the present embodiment is not limited thereto, but can use an attenuator that can perform attenuation over the entire range of frequencies.

In the above, the present disclosure has been specifically described by way of the embodiments. However, it is naturally understood that the present disclosure is not limited to the embodiments, and can be changed in various ways within the scope not departing from the gist thereof.

What is claimed is:

1. A communication device comprising:
    a first communication unit operable to communicate with a first external device by using a first frequency signal;
    a second communication unit operable to communicate with a second external device by using a second frequency signal; and
    a control unit operable to, when one of the first and second communication units transmits data to a corresponding one of the first and second external devices, control the other of the first and second communication units not to receive data,
    wherein the first communication unit includes a first attenuator that attenuates the second frequency signal,
    wherein the second communication unit includes a second attenuator that attenuates the first frequency signal,
    wherein the control unit includes a received power detection unit that detects power of a reception signal received via the first communication unit or the second communication unit,
    wherein the first communication unit further includes a third attenuator operable to attenuate the first frequency signal,
    wherein the second communication unit further includes a fourth attenuator operable to attenuate the second frequency signal, and
    wherein the received power detection unit
        makes the third attenuator operate when determining that the power of the reception signal from the first communication unit exceeds a predetermined threshold or more, and
        makes the fourth attenuator operate when determining that the power of the reception signal from the second communication unit exceeds a predetermined threshold or more.

2. The communication device according to claim 1, wherein the control unit
    makes the second attenuator operate when the first communication unit transmits data to the first external device, and
    makes the first attenuator operate when the second communication unit transmits data to the second external device.

3. The communication device according to claim 1,
    wherein the first attenuator attenuates a frequency signal in a predetermined range including the second frequency signal, and
    wherein the second attenuator attenuates a frequency signal in another predetermined range including the first frequency signal.

4. The communication device according to claim 1, wherein the control unit
    controls a timing of an operation of the second attenuator based on first transmission data from the first communication unit, and
    controls a timing of an operation of the first attenuator based on second transmission data from the second communication unit.

5. The communication device according to claim 4, wherein the control unit detects a length of the first transmission data or the second transmission data and controls the timing of the operation of the first or second attenuator based on a detection result.

6. The communication device according to any one of claim 1, wherein the first and second communication units are arranged in one housing.

\* \* \* \* \*